Dec. 22, 1931.  E. C. ELY ET AL  1,837,955
ELECTRICAL FIXTURE CONNECTING AND SUPPORTING DEVICE
Filed June 7, 1930
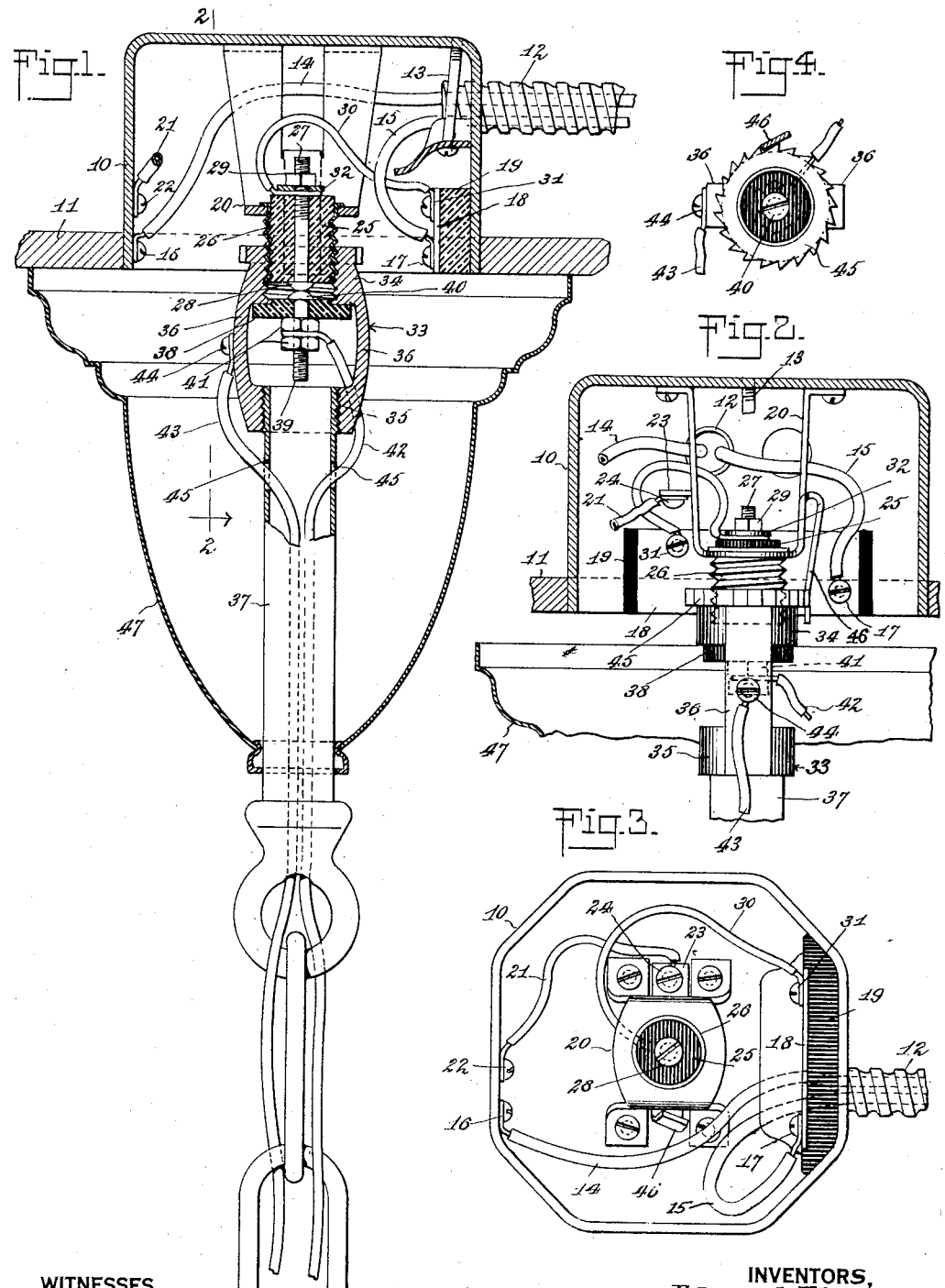
WITNESSES
William P. Goebel.
Chris Feinle.
INVENTORS,
Edgar C. Ely
Luther S. Ely, Jr.
Munn & Co.
ATTORNEYS.

Patented Dec. 22, 1931

1,837,955

UNITED STATES PATENT OFFICE

EDGAR C. ELY, OF CARBONDALE, AND LUTHER S. ELY, JR., OF BROOKLYN, PENNSYLVANIA

ELECTRICAL FIXTURE CONNECTING AND SUPPORTING DEVICE

Application filed June 7, 1930. Serial No. 459,720.

This invention relates to a means for electrically connecting a fixture, and also for suspending or supporting the fixture.

The invention contemplates the installation of an electrical fixture, chandelier or the like, preferably, but not necessarily, a ceiling fixture, in conjunction with house or building wiring and an outlet box.

The invention has for its general object the provision of an improved means of indicated character, which will not require soldering of wires, which enables a fixture to be readily installed, which eliminates short circuiting, which lock the fixture in place to thereby prevent the electrical connections from being broken, and which enables the fixture to be readily detached and alterations to be made whenever necessary or desirable.

With the foregoing and other objects in view, the invention resides in the particular provision, construction, arrangement and combination of the parts hereinafter fully described and illustrated in the accompanying drawings, in which:

Figure 1 is a vertical section through an outlet box and electrical fixture together with the device of the present invention applied thereto;

Figure 2 is a section on the line 2—2 of Figure 1, showing the canopy of the fixture lowered;

Figure 3 is an inside view of the outlet box showing the parts connected therewith;

Figure 4 is an end view of the coupling element.

Referring now more particularly to the several views of the drawings, it will be apparent that there is shown an outlet box 10 of standard form which, it is to be understood, will be secured to the form structure of a wall or ceiling 11. The box 10 has the usual knock-out disks, one of which has been removed to accommodate a flexible feeder conduit or armor 12 which is secured in any suitable manner, as at 13, to the box 10. Feed wires 14 and 15 extend through the armor 12 into the box 10, the wire 14 being electrically connected, as at 16, with the box 10, and the wire 15 being connected, as at 17, with a plate 18 of conducting material which is secured to a block of insulating material 19, the latter being secured to a wall of the box 10 between the plate 18 and said wall. A U-shaped bracket 20 of conducting material is secured to the box 10 interiorly thereof, and is electrically connected with the box 10 by a wire 21 which has one end connected with a wall 10 of the box, as at 22, and the opposite end thereof connected with a lug 23, forming a part of the bracket 20, as at 24. The bracket 20 is arranged centrally of the box 10. A fixture stud is provided which consists of an insulator 25 having an exterior thimble or ferrule 26 of threaded construction applied thereto. The stud is secured to the bracket 20 with the ferrule 26 electrically connected with the bracket 20. A binding post 27 extends through the insulator 25 and has a head 28 on one end, and its opposite end is threaded to receive a binding nut 29. A wire 30 has one end thereof electrically connected, as at 31, with the plate 18, and its opposite end is arranged between the insulator 25 and a metal disk 32, clamped in place by the nut 29 to electrically connect the wire 30 with the post 27. Use is made of a coupling element 33 of conducting material consisting of ends 34 and 35 which are connected together by longitudinal members 36 arranged diametrically opposite each other. The end 34 of the element 33 is tapped for threading engagement with the ferrule 26. The end 35 of the element 33 is rigidly secured in any suitable manner with the upper end of a rigid conduit 37 forming a part of a lighting fixture. A disk 38 of insulating material is secured in place on the end 34 of the element 33. A binding post 39 extends centrally through the disk 38 and has a head 40 on one end, and its opposite end is threaded to receive binding nuts 41. A lead wire 42 has one end thereof clamped between the nuts 41 to make electrical connection of the wire 42 with the post 39. A lead wire 43 is electrically connected, as at 44, with one end of the members 36 of the element 33. The wires 42 and 43 respectively extend through holes 45 in the conduit 37, and pass interiorly of the conduit to a lamp socket of the fixture.

From the foregoing it will be apparent that the coupling element 33 may be threaded on the ferrule 26 of the fixture stud to bring the head 40 of the binding post 39 in contact with the head 28 of the binding post 27. This will establish electrical connection between the feed wires 14 and 15 and the lead wires 42 and 43. In this manner a lighting fixture may be electrically connected, and also mechanically detachably connected and supported with respect to the outlet box 10.

In order to prevent reverse turning or unscrewing of the coupling element 33 there is provided a releasable device which comprises a ratchet wheel 45 forming part of the element 33 and a flexible pawl or dog 46 which coacts with the teeth of the ratchet wheel 45. The pawl or dog 46 in the present instance is upstruck from the material of the bracket 20. It will be understood that the coupling element 33 may be threaded on the ferrule 26, and in so doing the pawl or dog 46 will be flexed radially outward by the teeth of the ratchet wheel 45. When the coupling element 33 is brought to the proper adjusted position to establish electrical connection, the pawl or dog 46 will co-operate with one of the teeth of the ratchet wheel 45 to prevent unscrewing of the coupling element 33, except by disengaging the pawl or dog 46. The lighting fixture includes a canopy 47 which is detachably secured to the conduit 37, and serves with the outlet box 10 to enclose the parts. The canopy 47 may be slid downwardly on the conduit 37 in order to allow a suitable tool, such as a screw driver, to be projected between the upper edge of the canopy 47 and the ceiling 11 to hold the pawl or dog 46 out of engagement with the ratchet wheel 45 for the purpose of unscrewing the fixture from the fixture stud, that is to say, to permit the coupling element 33 to be unscrewed from the ferrule 26.

Claims:

1. The combination with a fixture and an outlet box, of means for electrically connecting the fixture with respect to said outlet box, and also mechanically detachably connecting and supporting said fixture with respect to said outlet box, said means including a stud carried by said outlet box; a rigid conduit forming a part of said fixture, an element coupling said conduit with said stud, and a releasable device which prevents the unscrewing of said coupling element.

2. The combination with an outlet box, of a bracket of conducting material electrically secured to said box on the inside thereof, a fixture stud positioned on said bracket, said stud comprising an insulator core, and a threaded thimble of conducting material fitting on said core and in electrical connection with said bracket; and a binding post extending through said core and having means on one end for electrically securing a conductor thereto, and also having a contact head on the opposite end.

3. The combination with an outlet box, of a bracket of conducting material electrically secured to said box on the inside thereof, a fixture stud positioned on said bracket, said stud comprising an insulator core, and a threaded thimble of conducting material fitting on said core and in electrical connection with said bracket; a binding post extending through said core and having means on one end for electrically securing a conductor thereto, and also having a contact head on the opposite end, and a coupling element of conducting material in threaded engagement with said thimble.

4. The combination with an outlet box, of a fixture stud in fixed position in said box, said stud comprising an insulator core, and a threaded thimble of conducting material fitting on said core and in electrical connection with said box; a binding post extending through said core and having means on one end for electrically securing a conductor thereto, and also having a contact head on the opposite end, a coupling element of conducting material in threaded engagement with said thimble, and a binding post carried by and insulated from said coupling element, said second binding post having a contact head on one end to engage the contact head on said first binding post, and also having means on the opposite end for electrically securing thereto a lead wire.

5. The combination with an outlet box, of a bracket of conducting material electrically secured to said box on the inside thereof, a fixture stud positioned on said bracket, said stud comprising an insulator core, and a threaded thimble of conducting material fitting on said core and in electrical connection with said bracket; a binding post extending through said core, a plate of conducting material secured to and insulated from said box, and a wire electrically connecting said binding post with said plate.

6. The combination with an outlet box, of a fixture stud in fixed position in said box, said stud comprising an insulator core, and a threaded thimble of conducting material fitting on said core and in electrical connection with said box; a binding post extending through said core, a coupling element of conducting material in threading engagement with said thimble, a binding post carried by and insulated from said coupling element and adapted to contact with said first binding post, a plate of conducting material secured to and insulated from said box, a wire electrically connecting said first binding post with said plate, and lead wires respectively electrically connected with said coupling element and second binding post.

7. The combination with an outlet box, of a bracket, a threaded fixture stud positioned on said bracket, a coupling element adapted to be screwed on and off of said stud, a ratchet wheel on said coupling element, and a flexible pawl on said bracket which coacts with said ratchet wheel to releasably prevent the coupling element from being unscrewed from said stud.

EDGAR C. ELY.
LUTHER S. ELY, Jr.